United States Patent [19]

Avny

[11] Patent Number: 4,926,687
[45] Date of Patent: May 22, 1990

[54] SYSTEM AND METHOD FOR OBTAINING A GIVEN PRELOAD ON A SPRING

[75] Inventor: Eli Avny, Rockford, Ill.

[73] Assignee: Sundstrand Corporation, Rockford, Ill.

[21] Appl. No.: 266,646

[22] Filed: Nov. 3, 1988

[51] Int. Cl.[5] .............................................. G01L 1/04
[52] U.S. Cl. ....................................................... 73/161
[58] Field of Search ................ 73/161; 267/140.2, 162

[56] References Cited

U.S. PATENT DOCUMENTS

| | | | |
|---|---|---|---|
| 738,747 | 9/1903 | Acly | 73/161 |
| 1,693,319 | 11/1928 | Simmons | 73/161 |
| 3,107,417 | 10/1963 | Jaquish, Jr. et al. | 29/157.1 R |
| 3,665,758 | 5/1972 | Tiller | 73/161 |
| 3,898,815 | 8/1975 | Young | 277/35 |
| 4,124,333 | 11/1978 | Liesener | 417/218 |
| 4,323,128 | 4/1982 | Young | 175/57 |
| 4,607,421 | 8/1986 | Zemek et al. | 29/157.1 R |
| 4,607,428 | 8/1986 | Neefe et al. | 29/436 |

FOREIGN PATENT DOCUMENTS 258280 7/1988 Fed. Rep. of Germany ........ 73/161
337398 3/1936 Italy .................................... 267/162

Primary Examiner—William A. Cuchlinski, Jr.
Assistant Examiner—W. Morris Worth
Attorney, Agent, or Firm—Wood, Phillips, Mason, Recktenwald & Van Santen

[57] ABSTRACT

A system and method for obtaining a given preload on a spring for use in a device which requires a given spring setting or preload. A receptacle is provided for containing the spring and including at least one member positionally movable in response to the spring setting. First shims are placed between the receptacle and the spring for adjusting the spring setting outside the device while the positiion of the movable member is fixed at the given preload. Second shims are placed between the receptacle and a portion of the device for readjusting the spring setting inside the device at the given preload. An access opening through the device affords observation from outside the device of the position of the movable member inside the device to compare the readjustment with the first adjustment.

16 Claims, 2 Drawing Sheets

SYSTEM AND METHOD FOR OBTAINING A GIVEN PRELOAD ON A SPRING

FIELD OF THE INVENTION

This invention generally relates to apparatus using preloaded springs and, more particularly, to a system and method for obtaining a given preload on a spring in a device which requires the given preload spring setting.

BACKGROUND OF THE INVENTION

There are a wide variety of apparatus or devices which use internal springs that are required to have a particular preload or spring setting. This is particularly true in the aerospace industry for such devices as torque limiters, clutches, brakes and the like. Such devices may include friction plates, ball-ramp mechanisms and the like which require preloading.

It is advantageous to control the preloading force of the spring within a small tolerance range or band. Otherwise, some of the components of the device have to be oversized to accommodate the upper limits of the tolerance range. Attempts have been made to alleviate this problem by providing a spring cartridge which contains the spring and preloading the spring within the cartridge externally of the housing and at a given preload or spring setting. The cartridge then is assembled within the housing presumably to maintain the given preload during use of the device. However, because of deflections of the housing itself and other internal components, it is difficult to predict what the preload level actually is once the cartridge is positioned in the housing.

This invention is directed to solving the above dilemma and satisfying a need for preloading an internal spring to a narrow preload tolerance range or band notwithstanding induced deflections occurring in components surrounding and/or mounting the spring internally.

SUMMARY OF THE INVENTION

An object, therefore, of the invention is to provide a new and improved system for obtaining a given preload on a spring for use in a device which requires a given preload on a spring or other resilient member.

Another object of the invention is to provide a method for obtaining the given preload as described.

Generally, in the exemplary embodiment of the invention receptacle means are provided for containing the spring and including at least one member positionally movable in response to the spring setting. First adjusting means are operatively associated between the spring and the movable member of the receptacle means for adjusting the spring setting outside the device while the position of the movable member is fixed at the given preload. A second adjusting means are operatively associated between the movable member and a portion of the device itself for readjusting the spring setting inside the device at the given preload. Access means are provided in the device to afford visual observation from outside the device of the position of the movable member inside the device to compare the readjustment with the initial adjustment.

As disclosed herein, the receptacle means include a pair of separable members sandwiching the spring therebetween and defining a gap between the separable members, whereby the gap can vary in response to the spring setting. The access means is in the form of an opening in the device, such as through the housing of the device, located in line with the gap when the receptacle means is properly located inside the device. The first adjusting means is in the form of shims for placing between the spring and one of the separable members, while the other member is grounded, such as in a bench fixture. The second adjusting means is in the form of shims for placing between one of the separable members and a portion of the device, such as the housing, while the other separable member is grounded in the housing. Therefore, the gap between the separable members while inside the device can be compared through the access opening with the gap which was preset outside the device in a bench fixture.

The invention also contemplates a method of performing the procedure of preloading the spring according to the concepts and with the structure described above.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
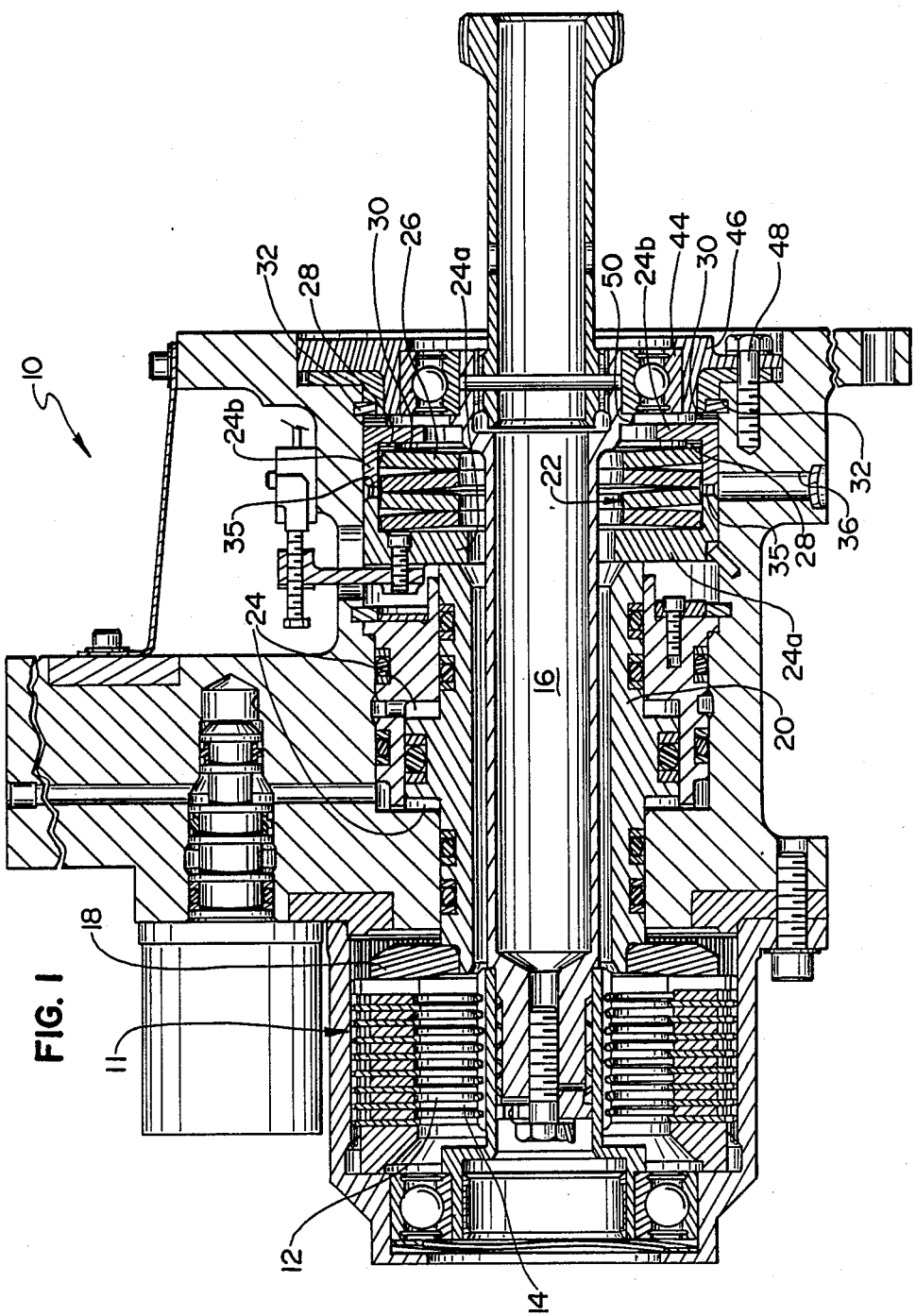
FIG. 1 is an axial section through a brake actuating device utilizing a spring preloaded according to the system and method of the invention.

Referring to the drawings in greater detail, and first to FIG. 1, the invention is shown as used in a device taking the form of a brake actuating device, generally designated 10. However, it should be understood, as stated above, that the invention has a wide range of applications in aerospace and other industries where various devices, such as torque limiters, clutches, brakes and the like require preloading of various internal parts, such as ball-ramp mechanisms, friction plates and the like. In addition, as will be described hereinafter, the spring is shown in a particular form in device 10. However, the concepts of the invention equally are applicable for preloading any type of "spring" device ranging from a coil spring to an elastomer block to any type of resilient member.

Briefly, brake actuating device 10 is of conventional configuration in that a plurality of interleaved disks 12 provide a brake means, generally designated 13. Alternating disks are fixed, as by splining at 14, to a drive shaft 16. The other alternating disks are fixed to a movable carrier 18. A piston 20 engages carrier 18 at one end and abuts one end of a spring cartridge, generally designated 22, at the other end. The piston is movable by admitting hydraulic pressure to chambers 24 to allow or prohibit the spring device from affecting brake means 13 to allow rotation or stop rotation of shaft 16.

As stated, such disk-type brakes for a rotating shaft, operatively associated with a spring, is a conventional device which requires preloading of the spring.

Spring cartridge 22 includes a pair of separable cup-shaped members 24a and 24b which define receptacle means for containing a spring 26. The particular spring shown is in the form of a plurality of belleville washers. Of course, as stated, the invention is applicable for any type of spring or resilient member.

Before proceeding with a description of the system and procedure of the invention, some important components should be identified in FIG. 1. In particular, first shim means 28 are shown between one end of spring 26 and the inside of cup-shaped separable member 24b. Second shim means 30 are provided between the outside of separable member 24b and a snap ring 32 fixed to a housing 34 of the device. It can be seen that a gap 35 is provided between separable members 24a and 24b. In addition, access means in the form of an opening 36 is provided through housing 34 to provide for visual observation of gap 35 from outside the device when the spring cartridge is properly positioned inside the device.

Figure 2:
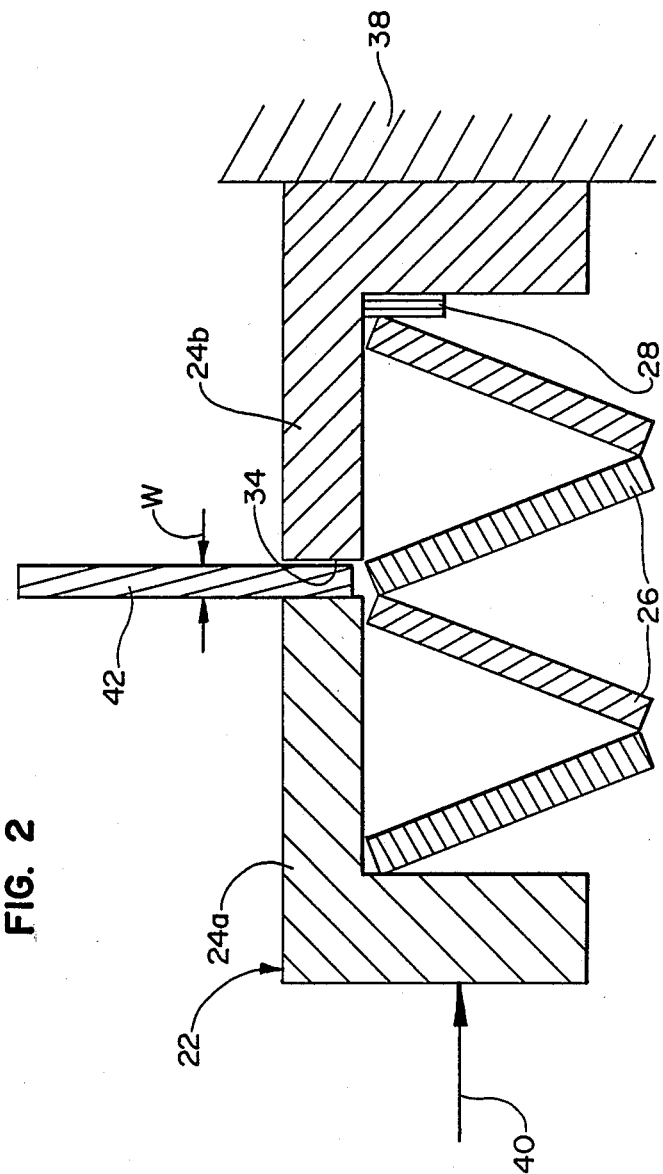
FIG. 2 is a somewhat schematic illustration of the preloading of the spring outside the device of FIG. 1.

Referring to FIG. 2, the system and procedure of the invention is initiated by placing spring cartridge 22 in a bench fixture. The details of the bench fixture are not all that important except that one of the separable members, member 24b as shown, is grounded, as at 38, while the other separable member is subject to a force applying mechanism, as indicated at 40. For instance, this could be accomplished in a calibrated or gauged press whereby the force at 40 can be determined or read. This will be the preload force on spring 26. First shim means 28 also are shown in FIG. 2, as well as gap 35 between separable members 24a, 24b. Therefore, it can be seen that spring 26 contained within the receptacle means defined by separable members 24a, 24b will oppose the preload force 40 to urge the members in a separating direction against the force. Although gap 35 could be observed and/or measured by optical means, a simple procedure is to use a probe 42 for insertion into gap 34 between the separable members. As will be understood hereinafter, the width W of probe 42 will define the ultimate gap which determines the precise preload on the spring when the spring cartridge is assembled in device 10 (FIG. 1).

With this understanding, the system and procedure contemplates placing probe 42 in gap 35. It can be understood that without any preload force 40 spring 26 would widen the gap more than width "W" of probe. A desired or given preload force then is applied at 40. The next step in the procedure is to adjust the spring setting such that gap 35 is just sufficiently to engage or touch the sides of the probe. This is done by a first adjusting means in the form of shim means 28. The shim means, in essence, comprises a plurality of thin shims which may be washer-like in shape to seat within cup-shaped member 24b between the cup-shaped member and spring 26, as shown. Once the proper number of shims are assembled within the spring cartridge to barely allow removal of probe 42, the precise setting of spring 26 has been achieved for the given preload force 40. In other words, the preload force actually is represented by the width of gap 35 as the bench setting described above determines the relationship between the gap and the preload. Once set, the spring cartridge, including shims 28, can be completely disassembled and assembled within device 10 and, as can be understood, the same preloading or setting of the spring can be achieved internally of the device as long as the width of gap 35 is the same.

To this end, and referring back to FIG. 1, the spring cartridge is easily assembled from the back-side of brake actuating device 10, i.e., the right side as viewed in the drawings. Bearing means 44 for shaft 16 are carried by a retaining member 46 which is secured to housing 34 by bolts 48. Once assembled, retaining member 46 bears against the outside (or right side) of bearing means 44, as the inside of the bearing means abuts against a housing shoulder 50.

However, before the bearing means, retaining member and bolts are secured in place, spring cartridge 22 is positioned within housing 35 as shown in FIG. 1. The spring cartridge now must be readjusted in order to maintain the precise dimensions of gap 34 as determined during the bench setting. This is accomplished by second adjusting means 30 which takes the form of additional thin shims which are positioned between separable member 24b and snap ring 32 rigid with housing 34. At this point, it should be understood, and as set forth in the claims, snap ring 32 essentially forms part of the housing and will move with the housing during any deflection caused by the spring forces. One or more shims making up second adjusting means 30 then are positioned as shown. Access opening 36 in housing 34 allows for visual observation of gap 35, or measurement of the gap by optical means, or by inserting probe 42 through opening 36 in an attempt to insert the probe into the gap. In essence, probe 42 comprises a "go-no-go" gauge. It either can be inserted into the gap or it cannot. Therefore, it can be understood that if too many shims are placed in position to move separable member 24b to the left and compress spring 26 too much, the probe cannot be inserted into the gap. This will indicate that a preload in excess to the given (or bench set) preload exists. One or more shims then must be removed. This procedure is continued until the probe can be inserted into gap 35 with little or no play. That means that the width of the gap is substantially identical to the width of the gap set during the bench setting of spring 26 with shims 28. The proper preload on the spring now has been accomplished and access through the rear of device 10 now can be closed by bearing means 44, retaining member 46 and bolts 48.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a device which requires a given preload on a spring or other resilient member, a system for obtaining the given preload comprising:

means for setting the spring under the influence of a given load;

receptacle means for containing the spring and including at least one member positionally movable relative to a fixed member in response to said spring setting;

first shim means for placing between the receptacle means and the spring for first adjusting the spring setting outside the device while the spring is under the influence of said given load whereby a position of the movable member is set responsive to the adjusting;

second shim means for placing between the receptacle means and a portion of the device for readjusting the spring setting inside the device; and access means in the device to afford observation from outside the device of the position of the movable member inside the device to compare the readjusting with the first adjusting.

2. The system of claim 1 wherein said receptacle means include a pair of separable members sandwiching the spring therebetween.

3. The system of claim 2 wherein said separable members are shaped to define a gap therebetween which can vary in response to the spring setting.

4. The system of claim 3 wherein said access means is located in line with the gap where the receptacle means is properly located inside the device.

5. The system of claim 2 wherein said device has abutment means for engaging one of said separable members and second access means for placing the second shim means therethrough against the other separable member.

6. In a device which requires a given preload on a spring or other resilient member, a system for obtaining the given preload comprising:

means for setting the spring under the influence of a given load;

receptacle means for containing the spring and including at least one member positionally movable relative to a fixed member in response to said spring setting;

first adjusting means operatively associated between the spring and the movable member of the receptacle means for first adjusting the spring setting outside the device while the spring is under the influence of said given load whereby a position of the movable member is set responsive to the adjusting;

second shim means for placing between the receptacle means and a portion of the device for readjusting the spring setting inside the device; and access means in the device to afford observation from outside the device of the position of the movable member inside the device to compare the readjusting with the first adjusting.

7. The system of claim 6 wherein said receptacle means include a pair of separable members sandwiching the spring therebetween.

8. The system of claim 7 wherein said separable members are shaped to define a gap therebetween which can vary in response to the spring setting.

9. The system of claim 8 wherein said access means is located in line with the gap where the receptacle means is properly located inside the device.

10. The system of claim 7 wherein said device has abutment means for engaging one of said separable members and second access means for placing the second shim means therethrough against the other separable member.

11. A method of obtaining a preload on a spring for use in a device which requires a given preload comprising the steps of:

applying a given load to the spring for initially setting the spring;

providing a receptacle means for containing the spring and including at least one member positionally movable relative to a fixed member in response to said spring setting;

first adjusting the setting of the spring to a given preload outside the device and determining the resulting position of said movable member;

placing the receptacle means and spring inside the device; and readjusting the setting of the spring inside the device through access means in the device so that the position of the movable member is the same as the position of the movable member resulting from the first setting.

12. The method of claim 11, including observing said position of the movable member inside the device through an access opening in the device.

13. The method of claim 11 wherein said first adjusting step and said readjusting step are carried out to achieve a given gap between the movable and fixed members of the receptacle means.

14. A method of obtaining a preload on a spring for use in a device which requires a given preload comprising the steps of:

applying a given load to the spring for initially setting the spring;

providing a receptacle means for containing the spring and including at least one member positionally movable relative to a fixed member in response to said spring setting;

first shimming the spring inside the receptacle means while the receptacle means and spring are outside the device to reset the spring to a given preload;

determining the position of the movable member resulting from said first shimming;

placing the receptacle means and spring inside the device; and reshimming the spring outside the receptacle means while the receptacle means and spring are inside the device through access means in the device, to the same position of the movable member resulting from the first shimming.

15. The method of claim 14, including observing said position of the movable member inside the device through an access opening in the device.

16. The method of claim 14 wherein said first shimming step and said reshimming step are carried out to achieve a given gap between the movable and fixed members of the receptacle means.

* * * * *